July 4, 1944.  G. B. LINDERMAN, JR., ET AL  2,352,644
APPARATUS FOR ESTIMATING RANGES
Filed July 15, 1942
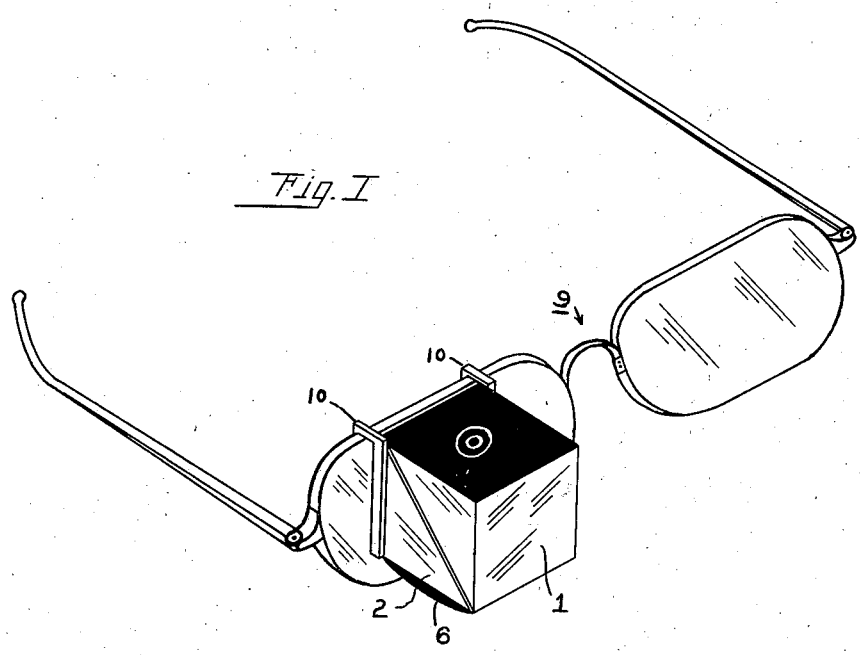
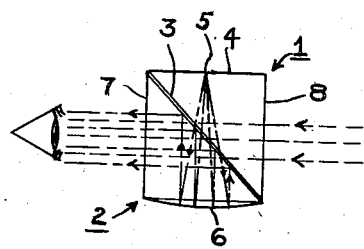
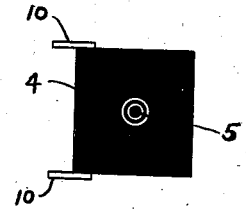
INVENTOR
GARRETT B. LINDERMAN Jr.
and
BY DONALD L. HIBBARD
ATTORNEY Patented July 4, 1944

2,352,644

UNITED STATES PATENT OFFICE 2,352,644

APPARATUS FOR ESTIMATING RANGES

Garrett B. Linderman, Jr., and Donald L. Hibbard, United States Navy

Application July 15, 1942, Serial No. 451,004

13 Claims. (Cl. 88—2.3)

(Granted under the act of March 3, 1883, as amended April 30, 1928; 370 O. G. 757)

Our invention relates to sighting devices, and in particular to an improved device of the type in which a luminous sight image appears superimposed upon the target in a line of sight established by a gunner using the device whereby the gunner by comparing the size of the target with the size of the sight image can estimate the distance from him to the target.

Sighting devices which operate upon this principle are particularly useful in aerial gunnery where guns are fired by the tracer aim method. As is well known, the sights of the gun are not used to determine the point of aim when this method is used since the gunner can see from the tracers where the bullets are going. It is essential, however, that the gunner know the range of the target.

Devices for producing a luminous sight image for use in sighting devices have been known in the art for many years, being disclosed in several prior patents such as, for example, U. S. Patent No. 683,203, to Grubb, but it is believed that the particular optical group embodying our invention is new and offers a type of construction which renders it particularly adaptable for attachment to the head of the gunner so that the latter can readily keep the device in front of one or both of his eyes while following the target.

In the drawing, which represents a preferred embodiment of our invention adaptable for attachment to goggles, Fig. I is a view in perspective of our sighting device in position on a pair of goggles;

Fig. II is a diagrammatic illustration of the optical principles utilized; and

Fig. III is a top plan view of our device.

Referring now to the drawing, our improved device for estimating ranges comprises a pair of right triangular prisms 1 and 2 of light pervious material such as, for example, crown glass. These prisms are secured together at their adjacently arranged inclined faces by any suitable means such as by a transparent cement. A very thin semi-transparent film 3 of a reflecting substance such as silver may be provided intermediate the inclined faces of the prisms. This film of silver which increases reflectivity of the inclined faces should be so thin, however, that it will not interfere materially with the gunner's vision through the prisms.

The top face 4 of the upper prism 1 is coated with silver or otherwise rendered opaque, except for a transparent or translucent sight pattern 5 which may be engraved or otherwise formed in the opaque coating. One other way of forming the sight image is to coat the face of the prism with a photographic emulsion and print, develop and fix the image of the sight rings thereon by ordinary photographic technique. Alternatively a photographic film or plate carrying the desired image may merely be cemented onto the face of the prism. In the present embodiment of our invention, this sight pattern comprises a pair of concentric rings, but it will be obvious that the sight pattern may take some other configuration if such is desired.

The bottom face of the lower prism 2 is ground convexly and is then coated with a reflecting material such as silver to form a concave reflector 6 which acts both as a reflecting surface and as a concave lens.

Reflector 6 may be spherical or it may be parabolic. In either case for best results, the sight rings should be located at the focus of the reflector. Light passing through the sight rings is reflected and focused at "infinity" by the reflector 6 and then strikes upon the inclined prism face and film of silver, and is turned into the eyes of the gunner. Light from the target comes directly through the prisms and film of silver in a horizontal direction and the sight rings appear to the gunner to be superimposed upon and at approximately the same distance from him as the target. This is shown diagrammatically in Fig. II.

Knowing the distance between the sight rings and also knowing the size of the target (this information having been committed to memory by the gunner beforehand), the gunner can then estimate how far the target is from him by reference to the comparative sizes of the sight rings and target.

To fasten the range finder to the goggles 9, a pair of L-shaped brackets 10—10 can be attached to the prisms by any suitable means and the device hung over the top of one of the lenses of the goggles, as illustrated in Fig. I.

In conclusion, it will be evident that by our novel structure we have provided a sighting device useful for estimating ranges which is extremely simple in design. The device, because of its simplicity, can thus be made very light in weight, making it particularly suitable for support by the gunner, either upon his goggles or fastened to a suitable head harness, so that the device can be moved quickly into or out of the gunner's line of vision.

While the foregoing embodiment represents a preferred form of our invention, it will be apparent that modifications may be made therein by those skilled in the art without departing from the spirit and scope of our invention.

As an example of a modification, the bottom face of the lower prism 2 may, if desired, be finished as a plane surface to which a separate concave reflector may be cemented. Also, it may be desirable to faintly tint the side face 8 of prism 1 under some conditions in order to increase the relative brilliancy of the sight pattern which is superimposed upon the target. Further, it may be desirable in some cases to attach a small electric lamp and a diffusing screen to the top face 4 of prism 1 in order to direct artificial light through the sight pattern 5 in the event that natural light is not sufficient to define a clear image of the sight pattern in the line of sight established by the gunner. Further, inclined transparent plates may be used to supplant the prisms, and perform their functions, if desired.

Also, while in the present embodiment we prefer to provide a thin film of reflecting material intermediate the inclined faces of the prisms to increase reflectivity of the inclined faces, it will be evident that our invention may be practiced without the film, in which case the inclined face alone would function to turn light received by it from the concave reflector 6 into the gunner's eyes.

The invention described herein may be manufactured and used by or for the Government of the United States of America for governmental purposes without the payment of any royalties thereon or therefor.

Having thus fully described our invention, we claim:

1. A sighting device comprising a light transmitting body having an inclined face through which a line of sight can be established to an object, a convex surface integral with said body, said surface having an axis forming an acute angle with said face, and a reflecting covering for said convex surface to form a concave reflector.

2. A sighting device comprising a light transmitting member having an inclined plane face, a top face bearing a sight pattern and a convex bottom face covered with reflecting material to form a concave reflector, whereby light passing said sight pattern and plane face will be reflected to said plane face and to the eye of a user to form an image of said sight pattern.

3. A sighting device comprising a light transmitting member having an inclined plane face, a sight pattern supported in a plane forming an acute angle with respect to the plane of said face and a substantially paraboloidal concave mirror having an axis perpendicular to the plane of said sight pattern, whereby light passing said sight pattern and plane face will be reflected from said mirror and plane face to the eye of a user to produce an image of said sight pattern.

4. In a sighting device the combination comprising a transparent member, said member having an inclined plane face through which a line of sight to a target may be established by the user, a sight pattern, and a concave reflector, said sight pattern and reflector being disposed on opposite sides of said inclined plane face of said transparent member whereby light passing through said sight pattern and inclined plane face to said reflector will be reflected back onto said inclined face and thence into the user's eye forming an image of said sight pattern superimposed upon said target, and means related to the body of said user substantially fixing said device with respect to the eye of said user.

5. A sighting device comprising a transparent member, said member having an inclined plane face and a semi-transparent reflecting film on said inclined face through which a line of sight to a target may be established by the user, a sight pattern, and a concave reflector, said sight pattern and reflector being disposed on opposite sides of said inclined plane face whereby light passing through said sight pattern and inclined plane face to said reflector will be reflected back onto said inclined face and thence into the user's eye forming an image of said sight pattern superimposed upon said target, and means related to the body of said user substantially fixing said device with respect to the eye of said user.

6. A sighting device comprising a transparent member, said member including side faces and an internal plane face inclined to said side faces through which the user may establish a line of sight to a target, a top face, said top face being opaque except for a sight pattern defined thereon, a bottom face, and a concave reflector disposed on said bottom face whereby light passing through said sight pattern and inclined face to said reflector will be reflected back onto said inclined face and thence into the user's eye forming an image of said sight pattern superimposed upon said target.

7. A sighting device comprising a transparent member, said member including side faces, an internal plane face inclined to said side faces and a semi-transparent film on said inclined face through which a line of sight to a target may be established by the user, a top face, said top face being opaque except for a sight pattern defined thereon, a bottom face, and a concave reflector disposed on said bottom face whereby light passing through said sight pattern and inclined face to said reflector will be reflected back onto said inclined face and thence into the user's eye forming an image of said sight pattern superimposed upon said target.

8. A sighting device comprising a transparent member, said member including side faces and an internal plane face inclined to said side faces through which the user may establish a line of sight to a target, a top face, said top face being opaque except for a sight pattern defined thereon, and a bottom face, said bottom face being convex and covered with reflecting material to form a concave reflector whereby light passing through said sight pattern and inclined face to said reflector will be reflected back onto said inclined face and thence into the user's eye forming an image of said sight pattern superimposed upon said target.

9. A sighting device comprising a transparent member, said member including side faces, an internal plane face inclined to said side faces and a semi-transparent film on said inclined face through which a line of sight to a target may be established by the user, a top face, said top face being opaque except for a sight pattern defined thereon, and a bottom face, said bottom face being convex and covered with reflecting material to form a concave reflector whereby light passing through said sight pattern and inclined face to said reflector will be reflected back onto said inclined face and thence into the user's eye forming an image of said sight pattern superimposed upon said target.

10. A sighting device comprising upper and lower triangular transparent prisms, means securing said prisms together with their inclined faces arranged adjacent each other, means for rendering the top face of said upper prism opaque except for a sight pattern defined thereon, and a concave reflector disposed on the bottom face of said lower prism whereby light passing through said sight pattern and inclined faces to said reflector will be reflected back onto said inclined faces and thence into the eye of the user to form an image of said sight pattern superimposed upon a target in a line of sight established by the user through oppositely disposed side faces of said prism.

11. A sighting device comprising upper and lower triangular transparent prisms, means securing said prisms together with their inclined faces arranged adjacent each other, a semitransparent film disposed intermediate said inclined faces, means for rendering the top face of said upper prism opaque except for a sight pattern defined thereon, and a concave reflector disposed on the bottom face of said lower prism whereby light passing through said sight pattern and inclined faces to said reflector will be reflected back onto said inclined faces and thence into the eye of the user to form an image of said sight pattern superimposed upon a target in a line of sight established by the user through oppositely disposed side faces of said prisms.

12. A sighting device comprising upper and lower triangular transparent prisms, means securing said prisms together with their inclined faces arranged adjacent each other, means for rendering the top face of said upper prism opaque except for a sight pattern defined thereon, and said bottom face of said lower prism being convex and covered with reflecting material to constitute a concave reflector whereby light passing through said sight pattern and inclined faces to said reflector will be reflected back onto said inclined faces and thence into the eye of the user to form an image of said sight pattern superimposed upon a target in a line of sight established by the user through oppositely disposed side faces of said prisms.

13. A sighting device comprising upper and lower triangular transparent prisms, means securing said prisms together with their inclined faces arranged adjacent each other, a semitransparent film disposed intermediate said inclined faces, means for rendering the top face of said upper prism opaque except for a sight pattern defined thereon, and said bottom face of said lower prism being convex and covered with reflecting material to constitute a concave reflector whereby light passing through said sight pattern and said inclined faces to said reflector will be reflected back onto said inclined faces and thence into the eye of the user to form an image of said sight pattern superimposed upon a target in a line of sight established by the user through oppositely disposed side faces of said prisms.

GARRETT B. LINDERMAN, JR.
DONALD L. HIBBARD.